United States Patent
Heardon

(10) Patent No.: US 9,441,084 B2
(45) Date of Patent: Sep. 13, 2016

(54) ONE-POT, HIGH-PERFORMANCE RECYCLING METHOD FOR POLYMER WASTE ACHIEVED THROUGH RENEWABLE POLYMER SYNTHESIS

(71) Applicant: 3matter, LLC, Boston, MA (US)

(72) Inventor: Keith Heardon, Boston, MA (US)

(73) Assignee: Poly6 Techniques, Boston, MA (US)

( * ) Notice: Subject to any disclaimer, the term of this patent is extended or adjusted under 35 U.S.C. 154(b) by 18 days.

(21) Appl. No.: 14/204,458

(22) Filed: Mar. 11, 2014

(65) Prior Publication Data

US 2014/0303268 A1    Oct. 9, 2014

Related U.S. Application Data

(60) Provisional application No. 61/779,078, filed on Mar. 13, 2013, provisional application No. 61/897,010, filed on Oct. 29, 2013.

(51) Int. Cl.
*C08J 11/04* (2006.01)
*C08L 81/02* (2006.01)

(52) U.S. Cl.
CPC ............... *C08J 11/04* (2013.01); *C08L 81/02* (2013.01); *Y02P 20/143* (2015.11); *Y02P 20/582* (2015.11); *Y02W 30/70* (2015.05)

(58) Field of Classification Search
CPC ...... C08L 81/02; C08L 25/06; C08F 112/08; C08J 11/04; Y02W 30/70
USPC ............................. 521/40–49.8; 524/502, 609
See application file for complete search history.

(56) References Cited

U.S. PATENT DOCUMENTS

| | | | | |
|---|---|---|---|---|
| 6,525,168 | B2* | 2/2003 | Zook | C08G 75/04 525/330.9 |
| 7,288,608 | B2 | 10/2007 | Bowman | |
| 2008/0121140 | A1 | 5/2008 | Fenn | |
| 2011/0319559 | A1* | 12/2011 | Kania | C08L 81/02 524/609 |

FOREIGN PATENT DOCUMENTS

| | | |
|---|---|---|
| EP | 1130070 | 9/2001 |
| EP | 1477511 | 11/2004 |

OTHER PUBLICATIONS

Claudino, et al., "Thiol-ene coupling kinetics of D-limonene: a versatile non-click\ free-radical reaction involving a natural terpene", J RSC, 3:11021-34 (2013a).
Claudino, "Macromolecular Design: UV-curable Thiol-ene networks based on renewable resources", Doctoral Thesis in Polymer Technology, Stockholm, Sweden (2013b).

(Continued)

*Primary Examiner* — Frances Tischler
(74) *Attorney, Agent, or Firm* — Pabst Patent Group LLP

(57) ABSTRACT

Compositions and processes for development of sustainable materials based upon a method of thermoplastic polymer recycling with a solvent that is also a monomer for renewable polymer synthesis. By combining petroleum-derived polymers with bio-based monomer feedstocks, biphasic, blended polymer products are produced and are shown to exhibit facile tunability of physical and material properties. This one-pot, solvent-based recycling approach yields neat recycled products without the use of solvent evaporation or solute precipitation, and the functional utility of the resulting polymer blends greatly exceeds that of either homopolymer alone.

38 Claims, 4 Drawing Sheets

DMA results for polymer synthesized using thiol-ene free radical addition of d-limonene/EPS solution and the tetrathiol pentaerythritol tetrakis(3-mercaptopropionate) (PETMP).

(56) References Cited

OTHER PUBLICATIONS

Firdaus, et a., "Terpene-based renewable monomers and polymers via thiol-ene additions", Macromolecules, 44:7253-62 (2011).

Norstrom, Terpenes as renewable monomers for biobased materials, Master of Science thesis, Stockholm, Sweden (2011).

Zhao and Schlaad, "Synthesis of terpene-based polymers", Adv Polym Sci., DOI: 10.1007/12_2011_166 (2012).

* cited by examiner

GPC trace for EPS foam sample taken from EPS cup purchased from Chick-fil-A, Inc.

DMA results for polymer synthesized using thiol-ene free radical addition of d-limonene/EPS solution and the tetrathiol pentaerythritol tetrakis(3-mercaptopropionate) (PETMP).

US 9,441,084 B2

ONE-POT, HIGH-PERFORMANCE RECYCLING METHOD FOR POLYMER WASTE ACHIEVED THROUGH RENEWABLE POLYMER SYNTHESIS

CROSS REFERENCE TO RELATED APPLICATIONS

This application claims benefit of Provisional Application Ser. No. 61/779,078 filed Mar. 13, 2013 and Provisional Application Ser. No. 61/897,010 filed Oct. 29, 2013. The contents and disclosures of each of these Provisional applications are incorporated herein by reference in their entirety for all purposes.

BACKGROUND

1. Field of Invention

This invention relates to a novel process for sustainable materials development that combines polymer recycling with a new method in renewable polymer synthesis to achieve nanocomposite polymeric products with high-performance material capabilities. This process enables the simultaneous densification, purification, and recycling of polymeric substrates in a "one-pot" procedure. The invention includes solvent chemical compositions, polymeric formulations, recycling procedures, methods of synthesis, and fabrication methods of end-product recycled polymers.

2. Background

As consumer demands drive increased global production of plastic products and waste, the need for innovative strategies for improving environmental sustainability continues to grow. As long as non-environmentally degradable plastics are produced, the development of improved recycling techniques must continue in order to decrease additional material consumption and to reduce non-degradable plastic waste content in landfills. (W. Mueller, *Waste Management* 2013, 33, 508). There is hope that progress in polymer science will eventually give rise to alternative plastic materials that may eliminate the need for the production of petroleum-based and other non-degradable plastics altogether, and recent studies have investigated the development of naturally based polymers (C. J. Besset, A. T. Lonnecker, J. M. Streff, K. L. Wooley, *Biomacromolecules* 2011, 12, 2512), (P. A. Wilbon, F. Chu, C. Tang, *Macromolecular Rapid Communications* 2013, 34, 8), (Yao, C. Tang, *Macromolecules* 2013, 46, 1689).

One drawback that often surrounds sustainable materials development is the seemingly pervasive notion that improving the environmental suitability of materials comes with a sacrifice in material functionality. (H. Lewis, in *Packaging for Sustainability*, (Eds: K. Verghese, H. Lewis, L. Fitzpatrick), Springer London, 2012, 41). Studies reporting material selection strategies often weigh material capabilities against environmental sustainability, (T. Tambouratzis, D. Karalekas, N. Moustakas, *Journal of Industrial Ecology* 2013, 10.1111/jiec.12035), and many recycling processes in general are assumed to bring about some degree of material deterioration. (S. Rajendran, L. Scelsi, A. Hodzic, C. Soutis, M. A. Al-Maadeed, *Resources, Conservation and Recycling* 2012, 60, 131).

The present invention is based on an alternative premise, that the development of new sustainable materials with increased inherent value (i.e., well-engineered, value-driving material properties) is possible through innovative design at the materials engineering level. The successful bulk synthesis of a new naturally-derived polymer system is disclosed and mechanical properties in this polymer system are tailored and improved through the addition of recycled polymer additives to yield polyphasic nanocomposite products. The disclosed process enables the simultaneous densification, purification and reclamation of polymeric waste, and the reclamation step is achieved utilizing a breakthrough development in renewable polymer synthesis.

The present invention, although applicable to numerous recyclable polymers and corresponding solvent/monomer/co-monomer formulations, is demonstrated through a process for recycling expanded polystyrene (EPS) waste. The difficulties associated with EPS recycling have been widely publicized. It is estimated that over 3 million tons of EPS are produced each year globally, with roughly 70% of EPS products being single-use food and beverage packaging. (J. A. Bhatti, Columbia University, 2010). Because both transporting low-density EPS waste and cleaning it to remove contaminant residue greatly increase cost and time required for EPS recycling, an overwhelming majority of food-contaminated EPS waste (e.g., an EPS cup with residual soda inside it) is not recycled. (M. Boatwright, S. Leonard, M. McDanel, K. Raleigh, E. Wright, L. Barlow, 2010; S. M. Al-Salem, P. Lettieri, J. Baeyens, *Waste Management* 2009, 29, 2625).

EPS recycling is often sub-categorized using three groups: (1) material recycling, the reduction of EPS volume using compression or dissolution in solvent; (2) chemical recycling, the breaking of covalent bonds to re-generate monomers or other small molecules; and (3) thermal recycling, the combustion of EPS waste to generate energy. (A. Kan, R. Demirboğa, *Journal of Materials Processing Technology* 2009, 209, 2994; T. Maharana, Y. S. Negi, B. Mohanty, *Polymer-Plastics Technology and Engineering* 2007, 46, 729). The present invention focuses on material recycling processes. Traditionally, the most cost-effective method of recycling EPS has been to heat non-contaminated EPS waste above its glass transition and/or compact it to produce densified, recycled polystyrene. Since mechanical densifiers require that EPS be contaminant free before compaction, mechanical densification is not ideal for recycling food or drink contaminated waste items and not practical for recycling the roughly 70% of EPS waste that is used for single-used food and beverage packaging.

It is known that an alternative material recycling method for EPS is a solvent-based approach, in which clean EPS waste is dissolved in a suitable organic solvent such as acetone. The dissolution process results in the densification of the EPS waste, and the removal of the solvent affords recycled polymeric products. Solvent-based recycling has been shown to be suitable for some contaminated EPS substrates because many contaminants are insoluble in solvents that dissolve EPS and can be removed using coarse filtration after EPS dissolution. (J. M. Seo, B. B. Hwang, "A Reappraisal of Various Compacting Processes for Wasted Expandable Polystyrene (EPS) Foam", presented at *Materials Science Forum*, 2006). The solubility and behavior of EPS in multiple solvents has been previously reported. (M. T. García, I. Gracia, G. Duque, A. d. Lucas, J. F. Rodríguez, *Waste Management* 2009, 29, 1814; S. Shikata, T. Watanabe, K. Hattori, M. Aoyama, T. Miyakoshi, *J Mater Cycles Waste Manag* 2011, 13, 127). Polystyrene has been shown to be especially soluble in aromatic solvents such as toluene, and studies have also reported the solubility of PS in the naturally occurring citrus fruit extract D-limonene, (R. T. Mathers, K. C. McMahon, K. Damodaran, C. J. Retarides, D. J. Kelley, *Macromolecules* 2006, 39, 8982) which has a similar dielectric constant to that of toluene. (G. A. Thomas, J. E. Hawkins, *Journal of the American Chemical Society* 1954, 76, 4856). In the late 1990's and early 2000's Sony Corporation instituted a solvent-based recycling effort in Japan, in which D-limonene was used to recycle EPS waste, which was reclaimed from solution by evaporation of D-limonene. Sony's report of this recycling process is extremely in-depth, but this recycling effort appears to have been abandoned sometime between 2004 and 2006. (T. Noguchi, M. Miyashita, Y. Inagaki, H. Watanabe, *Packaging Technology and Science* 1998, 11, 19). Considering the low inherent value of recycled polystyrene, Sony's apparent decision to cease this recycling effort may have been financially motivated. Other studies have reported limonene-based recycling processes in which PS is reclaimed from solution in limonene using electrospinning or by precipitation by mixing with supercritical carbon dioxide. (C. Shin, G. G. Chase, *Polymer Bulletin* 2005, 55, 209 and C. Gutiérrez, M. García, I. Gracia, A. Lucas, J. Rodríguez, *J Mater Cycles Waste Manag* 2012, 14, 308).

The present invention is based on an alternative premise; that the development of new sustainable materials with increased inherent value (i.e., well-engineered, value-driving material properties) is possible through innovative design at the materials engineering level.

SUMMARY

Disclosed is a novel approach to sustainable materials development that is based upon a new strategy for thermoplastic polymer recycling using a renewable polymer synthesis for recovery of the polystyrene. By combining petroleum-derived polymers with bio-based monomer feedstocks, biphasic, blended polymer products are produced and are shown to exhibit facile tunability of physical and material properties. This one-pot, solvent-based recycling approach yields neat recycled products without the use of solvent evaporation or solute precipitation, and the functional utility of the resulting polymer blends greatly exceeds that of either homopolymer alone. In embodiments, the invention is (1) a new method for recycling thermoplastic polymers, including polystyrene (PS) and particularly expanded polystyrene (EPS) waste such as that used in food and beverage packaging applications. In a second embodiment, the invention is (2) a new materials engineering method(s) for improving the material attributes of network polymers (including novel naturally-derived network rubbers) through nanocomposite polymer synthesis. In a third embodiment, the invention is (3) a series of products and processes for producing these products that demonstrate that these new sustainable materials can be manufactured using a wide range of industrial processing techniques into substrates with desirable geometries and unique and tunable nanoscale or microscale morphologies and porosities if so desired.

DESCRIPTION OF FIGURES

The accompanying drawings, which are incorporated into and constitute a part of the specification, illustrate specific embodiments of the invention and, together with the general description of the invention given above, and the detailed description of the specific embodiments, serve to explain the principles of the invention.

DESCRIPTION

Figure 1:
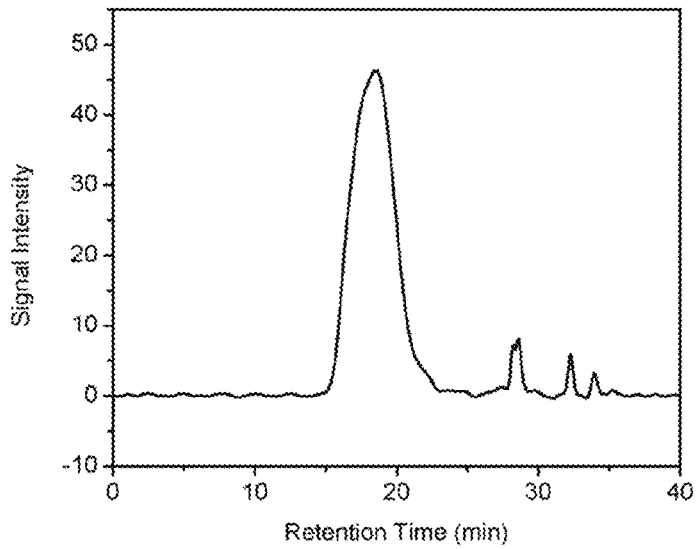
FIG. 1 is a GPC trace for EPS foam sample taken from EPS cup purchased from Chick-fil-A, Inc.

The invention, in a broad scope, combines multi-component processes for sustainable materials development that, in one embodiment, employ an innovative thermoplastic polymer recycling technique that enables the simultaneous densification (in the case of polymer foams), purification and reclamation of contaminated polymeric waste. This solvent-based material recycling approach achieves densification of polymeric foams through dissolution in an organic solvent and simultaneously achieves purification by dissolving polymeric substrates through an extraction processes through which immiscible layers of polymer solution and contaminants are separated. Furthermore, this recycling approach employs a novel polymer reclamation process that allows recovery of recycled thermoplastic polymers from solution using a one-pot procedure without requiring the use of solvent evaporation or precipitation of dissolved polymers. In this novel polymer reclamation process, the solvent that is used to dissolve and purify to-be-recycled polymers is also capable of functioning as a monomer, either through homopolymerization or through polymerization with co-monomer species, and end-product recycled composites are obtained by bulk polymerization of the solvent/monomer species in the presence of dissolved polymers. While the novel recycling technique of the invention's first embodiments is applicable to a wide array of polymer substrates and solvent/monomer/co-monomer species, this process is demonstrated experimentally through the synthesis of a composite polymer system that is comprised in part of a recycled thermoplastic petroleum-derived polymer, polystyrene, and in part of a newly reported series of naturally-derived rubber networks prepared by bulk curing the citrus fruit extract D-limonene with a polythiol co-monomer. This combined recycling and naturally-derived polymer innovation represents a unique approach to sustainable materials development.

There are three important broad aspects or embodiments of the present invention:

1. Waste polymer recovery process, comprising;
   a. Placing polymer waste and water solvable contaminant(s) in a biphasic solvent mixture, having a solvent(s) that dissolves the polymer and a solvent(s) that dissolves the water solvable or water dispersible contaminants into an aqueous solution; discarding the aqueous or other immiscible solution and recovering the polymer/solvent, and reclaiming dissolved polymer waste by polymerization of solvent, which is also made to function as a monomer, to afford multicomponent/composite reclaimed polymeric products.

b. Same as a. but reducing the polymer waste to small particles, adding water or water like solvent, separating the polymer waste from the water solvable or water dispersible contaminant in water by filtering or allowing polymer foam waste particulates to float to the top of the water or water like solvent and decanting before placing it in biphasic solvents, discarding the contaminated aqueous solution.

2. A system of polymeric materials with tunable thermomechanical, tensile, shape memory and other material properties that are the combined reaction product of a dissolved polymer such as polystyrene and a solvent/monomer such as PS+D-limonene plus, and optionally a co-monomer such as the polythiol trimethylolpropane tris(3-mercaptopropionate) (TMPTMP) to form a microscale or nanoscale composite (i.e "nanocomposite") consisting of a network matrix that results from the polymerization of the solvent/monomer and a heterophase that consists of dispersed PS or other thermoplastic precipitate phases. This system of polymeric materials includes limonene-derived network polymers produced by UV or heat catalyzed thiol-ene free radical addition polymerization of limonene with polythiol co-monomers and the reinforcement of such network polymers with thermoplastic fillers such as polystyrene as well as other fillers, such as silica.

3. Products comprising waste polymer and solvent/monomers such as PS, D-limonene, polythiol illustrative in various states of reaction, such as:

a. PS as solid phase in D-limonene+TMPTMP.
  b. PS, D-limonene+TMPTMP dissolved at 100-180° C.; cooled to ambient temperature to form PS/D-limonene/thiol uncured putty. Product is the mix or the putty, which can be stored and later processed using 3D printing, molding, or other techniques and subsequently cured by UV exposure or other curing techniques.
  c. Structures and articles of manufacture made from molded composition of b.—heated to 100-180° C. and cured with UV irradiation (or heat).
  d. Porous polymeric products prepared by extraction of thermoplastic phase precipitates from composite materials such as those in Embodiment 2 using an organic solvent or other thermoplastic removal technique. Such porous polymeric materials may exhibit unique micro- or nanoporous structural morphologies because of the processes used to produce them, and removal of EPS by extraction from these recycled polymeric products represents a repeatable life cycle for polystyrene or, in simpler terms, a method of recycling the recycled materials described in the invention.

Suitable polymeric materials are selected from the group of polymers consisting of polystyrene, polyvinyl chloride, polyethylene-terphalate, poly(methyl methacrylate), poly(bisphenol A carbonate), poly(acrylonitrile-co-butadiene-co-styrene), poly(lactic acid), thermoplastic polyurethane and combination thereof. Suitable polymer solvents comprise ethyl acetate, dichloromethane, styrene, D-limonene, L-limonene or other DL-limonene mixtures, gasoline, biodiesel, super critical $CO_2$, supercritical $N_2$, supercritical isoprene, supercritical ethylene or any combination thereof, including the addition of $scCO_2$ and $scN_2$ to cause the precipitation of polymers dissolved in the first solvent(s).

An important aspect of an embodiments of this invention is the fact that D-limonene can both dissolve polystyrene and can also function as a diene monomer in thiol-ene reactions to enable a new method of expanded polystyrene reclamation. Thiol-ene "click" chemistry is a powerful synthetic tool that is being implemented in increasingly diverse areas of polymer science. See M. J. Kade, D. J. Burke, C. J. Hawker, *Journal of Polymer Science Part A: Polymer Chemistry* 2010, 48, 743.

The reaction between C═C and SH functional groups, which is often UV catalyzed but can also proceed under elevated temperature conditions, is highly efficient, tolerant of many functional groups, and capable of proceeding under mild conditions. (D. P. Nair, N. B. Cramer, T. F. Scott, C. N. Bowman, R. Shandas, *Polymer* 2010, 51, 4383). A number of network polymers have been prepared from polyfunctional alkene and polythiol monomers and utilized in applications ranging from medical to commodity devices. (T. Ware, D. Simon, K. Hearon, C. Liu, S. Shah, J. Reeder, N. Khodaparast, M. P. Kilgard, D. J. Maitland, R. L. Rennaker, W. E. Voit, *Macromolecular Materials and Engineering* 2012, 297, 1193).

D-Limonene consists of two C═C groups and is capable of functioning as a monomer in thiol-ene polymerization reactions with a co-monomer such as trimethylolpropane tris(3-mercaptopropionate) (TMPTMP).

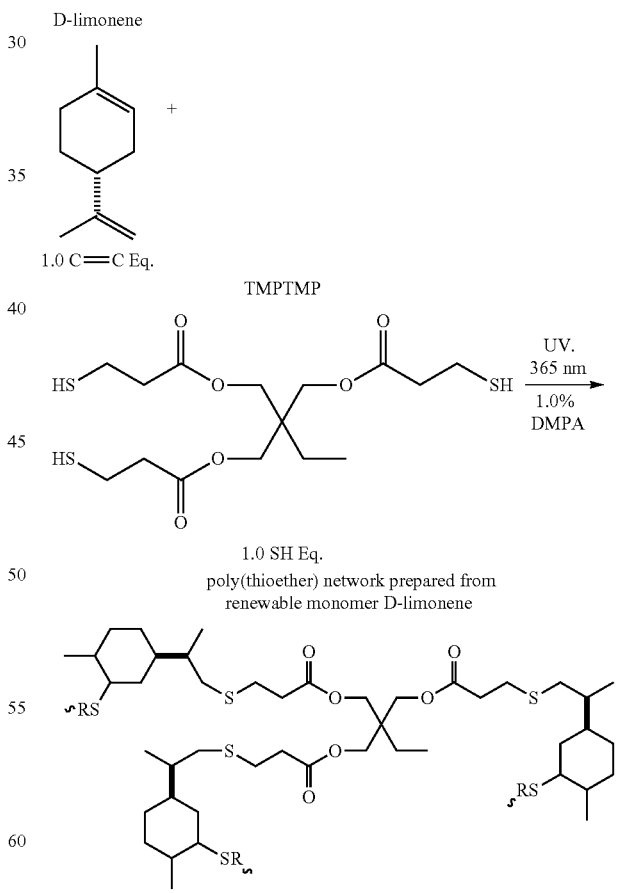

A poly(thioether) network synthesized from D-limonene would thus be, by definition, derived from a naturally-occurring precursor. It was observed that at temperatures near 25° C., D-limonene and TMPTMP mixtures are immiscible, although brief 365 nm UV irradiation and/or heating eventually results in the formation of a homogeneous solution that can be transferred to a mold without further network formation occurring until subsequent exposure to UV irradiation. When EPS is added to the network illustrated above at 25° C. an insoluble mixture is obtained. When heated to 140° C. a homogenous dissolution mixture is obtained that can be molded and cured to form a nanocomposite with mechanical properties that can be tailored and improved by varying PS content.

Published studies have reported the synthesis of polymers through multi-step processes in which D-limonene is first functionalized and then subjected to various methods of polymerization. Applicant is not aware that a successful synthesis and characterization of a polymer blend comprised of a thermoplastic additive dispersed in poly(thioether) matrix has been reported.

1. Waste Polymer Recovery Process

The invention is, in one set of embodiments, a process for reclamation (recovery) of contaminated waste expanded polystyrene (EPS). The process enables the simultaneous densification, purification, and reclamation of food or beverage-contaminated and other expanded polystyrene (EPS) waste. In this process, a polymeric substrate with one or more contaminant species is immersed in a polyphasic mixture of immiscible solvents (i.e., an "oil and water" type of mixture). One solvent phase is capable of dissolving the polymeric substrate itself, and the other solvent phase or phases are capable of dissolving the contaminant species present (such as aqueous solvable materials like soft drinks and the like). Any combination of two (or more) immiscible solvents of which one is capable of dissolving a to-be-recycled polymer and the other is capable of dissolving, dispersing or otherwise purifying contaminant residue is sufficient for the purposes of the invention.

After dissolution of the polymeric substrate and contaminant species, the solvent layers containing the contaminants are discarded or recycled, and the solvent layer containing the dissolved polymeric substrate is preserved. Recovery of the dissolved polymer can then be achieved by solvent evaporation, polymer precipitation, other processes, or in accordance with this invention, by the novel polymerization process described as embodiments herein. In this process, the solvent that dissolves the polymeric substrate is also capable of functioning as a monomer and undergoing polymerization reactions, which may or may not require the addition of polymerization initiators or co-monomers. Once a final mixture of dissolved polymeric substrate, solvent/monomer, and initiator/co-monomer is prepared, the polymerization reaction is then carried out, resulting in a biphasic composite polymeric system that consists of a network phase that forms as the result of curing the solvent/monomer and a precipitated thermoplastic polymer phase that is comprised of recycled polymer dispersed throughout a solvent/monomer-comonomer network matrix or some other macromolecular architectural framework. The source of the solvent/monomer may be a renewable, sustainable resource such as a plant product extract or a genetically engineered bacteria species.

For example, Applicant has shown that d-limonene, a terpene molecule that occurs naturally in citrus fruit rinds, is capable of both dissolving certain plastic substrates and undergoing a UV-catalyzed thiol-ene polymerization reaction with polythiol monomers such as trimethylolpropane tris(3-mercaptopropionate) (TMPTMP). When a polymer substrate is dissolved in the d-limonene, the TMPTMP co-monomer is added, and a thiol-ene polymerization is carried out, the final product is a network poly(thioether) matrix that contains dispersed micro- or nanoscale precipitate phases of thermoplastic polymer that can act as matrix reinforcers that significantly improve mechanical integrity. This invention specifically includes genetically engineered bacteria species and other renewable resources as potential sources of the solvent/monomer for the recycling process described.

The overall recycling process in the first embodiments of the invention was demonstrated in the following way. An organic solvent capable of dissolving a polymeric waste substrate, which may be purchased from a distributor or obtained using a renewable resource such as a plant product or a genetically engineered bacteria species, is placed in a reservoir. The solvent is used in a polyphasic mixture with one or more other immiscible solvent(s) to selectively dissolve polymeric substrates, and the other solvent phases present are used to dissolve any contaminant species. The other solvent/contaminant solutions are discarded or recycled and the solvent that contains the dissolved polymer is maintained. For example, d-limonene is such as solvent, which is found in citrus fruit rinds and has also been shown to be producible using genetically engineered bacteria species. D-limonene can dissolve polystyrene foam. In an embodiment of this invention, reservoirs containing water and d-limonene are placed outside commercial entities (such as fast food restaurants and convenience stores) that sell products in polystyrene foam containers. A typical polymer waste product may be a polystyrene foam cup containing residual soda and melted ice. The PS cup is dissolved in the layer of d-limonene in the reservoir, and the soda and melted ice are dissolved in the aqueous layer. The aqueous layer containing the dissolved contaminant residue is discarded, and the limonene layer containing the dissolved polystyrene is preserved. A polythiol co-monomer and a photoinitiator is then added to the limonene/polystyrene solution, and the final solution could be UV-cured to generate a new polymeric product. This process has been demonstrated experimentally.

Included in the first embodiment of the invention is a portable self-contained system for use at the site of polymeric material disposal (such as at fast food restaurants and convenience stores) to enable the polymeric waste (such as polystyrene cups and trays) to be placed into the container system, separated into disposable non-polymer waste and dissolved polymer for recovery. The system can be a container with an opening and preferably a lid, the container containing at least two immiscible solvents, one for the polymeric material and one for the contaminants (generally water soluble materials such as soft drinks, water and the like. The container may also comprise a means to separate solid contaminant waste such as paper, eating utensils and the like from the polymeric material to be recovered by dissolution in the solvent. Illustrative of a system of this embodiment is a 6 feet cube container mounted on skids or a base that is easily lifted to a truck or other conveyance. The container will contain desired amounts of water and d-limonene or other solvents. The container will have a subdivided section or an appended separate container to collect non-polymeric solid waste.

An in-use container will be delivered to a site, and workers or other users will place polymeric waste and contaminants into the container, and when filled or on a pre-determined schedule, the container will be picked up (or have its contents emptied), delivered to a centralized location for recovery of the dissolved polymer, cleaned, refilled, and readied for return to use (or the recycled solvent will be returned to the original on-site container). The solution containing the thermoplastic to-be-recycled polymer will then be cured using the novel reclamation process specified herein by polymerization to make new polymer products.

In another aspect of the first embodiments of the invention, the invention includes methods for producing solvents for dissolving polymers such as d-limonene. For example, d-limonene is extracted from citrus fruit rinds (preferably lemon rinds) by distillation, extraction or other suitable means known to those skilled in the art. This process may generally be located in a central location to provide solvents to the systems for waste polymer dissolution or may be located adjacent or as a part of the waste dissolution system. A similar method of producing solvents uses a bioreactor in which genetically engineered bacteria are used to produce suitable solvent material from suitable natural products such as citrus rinds and the like.

Example 1

Procedure for GPC Analysis of EPS

Gel permeation chromatography (GPC) measurements were conducted on expanded polystyrene foam (EPS) samples taken from a series of EPS cups purchased from Chick-fil-A, Inc. A tetrahydrofuran GPC system equipped with a Waters Chromatography (Milford, Mass.) model 1515 isocratic pump, a model 2414 differential refractometer, and a three-column set of Polymer Laboratories (Amherst, Mass.) Styragel columns (PLgel 5 μm Mixed C, 500 Å, and 104 Å, 300_7.5 mm columns). The system was equilibrated at 35° C. in tetrahydrofuran, which served as the polymer solvent and eluent (flow rate set to 1.00 mL/min). Polymer solutions were prepared at a known concentration (ca. 3 mg/mL), filtered with a 0.2 micron PTFE mesh filter, and an injection volume of 200 μL was used. Data collection and analyses were performed with Precision Acquire software and Discovery 32 software (PrecisionDetectors). The differential refractometer was calibrated with standard polystyrene materials (SRM 706 NIST). An example GPC trace and corresponding molecular weight data are provided in FIG. 1 and Table 1, respectively.

TABLE 1

Molecular weight data for GPC trace of EPS sample shown in FIG. 1.

| $M_n$ (Da) | $M_w$ (Da) | Polydispersity Index |
|---|---|---|
| 150200 | 395800 | 2.635 |

Procedure for EPS Solubility Experiments:

20 small EPS cups purchased from Chick-fil-A, Inc. were massed, and the average mass data and standard deviation is provided in Table 2.

TABLE 2

Average EPS cup weight and standard deviation for 20 EPS cups purchased from Chick-fil-A, Inc.

| Avg Cup Weight (g) | Std Dev |
|---|---|
| 5.415 | 0.074 |

The data in Table 2 were used to calculate the solubility of the cups in various solvents in cups/gallon. EPS cups were broken down in a professional grade blender to a fine powder, washed with water, and dried in an oven at 100° C. over three days. The powder was used for gel permeation chromatography (vide supra) and solubility tests. EPS solubility tests were conducted for dichloromethane, d-limonene, styrene, ethyl acetate, acetone, petroleum ether, and gasoline (87 octane rating). 5 mL of each solvent was measured and poured into a 20 mL dram vial with a PTFE stir bar. Each vial was sealed and weighed before any polystyrene was added. The vials remained sealed during duration of the experiments except for the time of each EPS addition to prevent solvent evaporation. A small amount of EPS was added to each vial (ca. 50 mg) and allowed to stir until completely dissolved. Dissolution was aided by vortexing. After each iteration of EPS addition, the solutions were assessed for EPS saturation. EPS addition was terminated when deemed saturated, either when no more EPS would go into solution or until the mixture viscosity prevented stir bar movement. Vials were then weighed to calculate the amount polymer added and each respective EPS solubility. The results of the solubility studies are provided in Table 3.

TABLE 3

Solubility study results for EPS samples taken from Chick-fil-A foam cups for various solvents. Solubility data are provided in cups/gallon solvent.

| Solvent | Cups/Gallon |
|---|---|
| Acetone | <77.20 |
| Dichloromethane | 474.44 |
| Ethyl Acetate | 447.63 |
| Gasoline (87 octane) | <155.71 |
| Limonene | 423.10 |
| Petroleum Ether | <11.2 |
| Styrene | 405.37 |

Dichloromethane and ethyl acetate dissolved the largest amount of EPS, and more polar solvents were not as successful at dissolving similar amounts of polymer (acetone, petroleum ether). D-limonene and styrene also performed well, dissolving nearly as much as dichloromethane and ethyl acetate. 87 octane gasoline was a poor solvent choice for dissolving EPS. Very little of the EPS went into solution, and instead, the EPS mainly swelled. This behavior remained consistent even after one day of stirring at 25° C. The same also occurred for acetone and petroleum ether.

Procedure for Demonstrating Extraction-Based Purification of EPS Cup Containing 100 mL Coca-Cola:

100 mL of Coca-Cola™ was poured from an unopened can into a 250 mL glass beaker. The Coca-Cola™ was then poured from the glass beaker into a small EPS cup purchased from Chick-fil-A, Inc. 200 mL d-limonene, which was purchased from TCI America, was also poured into a 500 mL glass beaker. The beaker containing the d-limonene was placed on a stir plate at 25° C., and a PTFE stir bar was added. The EPS cup containing the 100 mL Coca-Cola© was then inserted in the beaker that contained the 200 mL d-limonene, and the solution was stirred at a stir setting of 2 (out of 10). After 20-30 seconds, the cup began to dissolve, and after 45 seconds, the cup burst open, and it's Coca-Cola™ contents spilled into the beaker of d-limonene. The EPS cup was stirred in the d-limonene/Coca-Cola™ mixture for an additional 4 min, after which it was determined to be completely dissolved. Upon turning off the stirring of the solution, two immiscible layers immediately were observable in the 500 mL beaker: the top layer consisted of the EPS cup dissolved in d-limonene, and the bottom layer consisted of Coca-Cola™.

Procedure for EPS Reclamation by Curing d-Limonene/EPS Solution Using UV-Catalyzed Thiol-Ene Free Radical Addition:

Using a syringe, 5 mL of the top layer of the two-layer mixture described above that resulted from dissolution of a Coca-Cola™ containing EPS cup into D-limonene was placed in a 20 mL glass vial. Based on the initial mass of the EPS cup and the initial volume of limonene to which the cup was added, a PS concentration of 26.1 mg EPS/mL limonene was assumed, and mass of limonene in the solution, which has a C═C functionality of 2, was calculated accordingly. A stoichiometric amount of the tetrathiol pentaerythritol tetrakis(3-mercaptopropionate) (PETMP) was added to the solution to give a C═C:SH ratio of 1:1. 1 wt % of the photoinitiator 2,2-dimethoxy-2-phenylacetophenone (DMPA) was also added to the solution. The PETMP was not initially miscible with the d-limonene/EPS solution; however, upon exposure to 365 nm UV light in a UVP CL-1000 UV Crosslinking Chamber for 20 seconds, the mixture increased in viscosity and eventually became completely clear. The viscous solution was then pipetted out of the glass vial and injected between two 2"×3" glass microscope slides separated by two 1 mm-thick glass spacers and held together using binder clips. The glass slides containing the injected solution were then placed in the UVP Crosslinking Chamber, exposed to 365 nm UV light for 30 min, and subsequently removed from the chamber. Upon separation of the glass slides, an elastomeric film with sufficient mechanical integrity to handle was observed to have formed. The film was post-cured at 120° C. at 1 torr for 12 hours, after which it was removed, handled, and subjected to thermo-mechanical characterization experiments. Because the EPS composition in this mixture was very low in this example (<0.5 wt %), minimal phase separation was observed in the resulting rubber.

Figure 2:
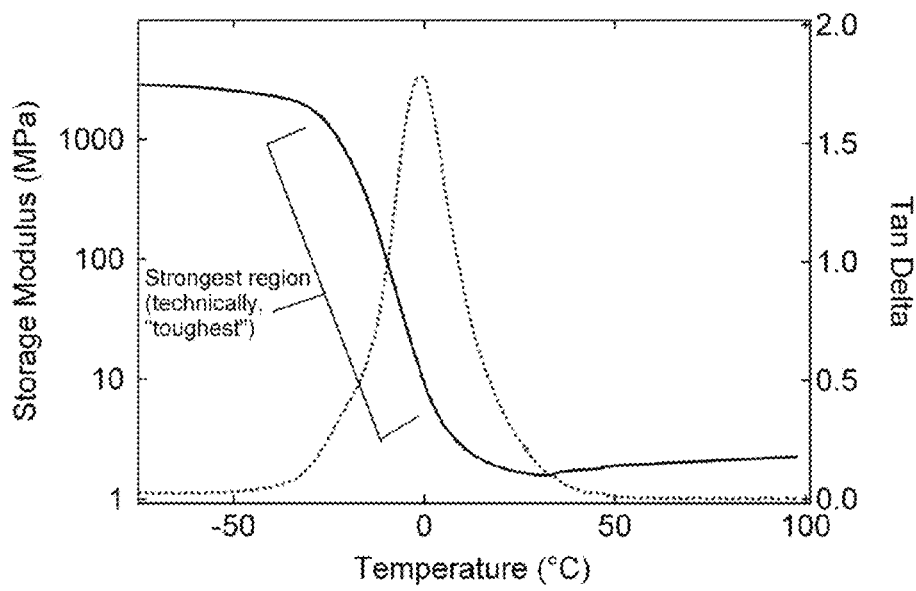
FIG. 2 is a plot of DMA results for polymer synthesized using thiol-ene free radical addition of d-limonene/EPS solution and the tetrathiol pentaerythritol tetrakis(3-mercaptopropionate) (PETMP).

Dynamic Mechanical Analysis:

4 mm×30 mm×1.0 mm rectangular samples for dynamic mechanical analysis (DMA) were machined using a Gravograph LS100 40 W $CO_2$ laser machining device. DMA was performed using a TA Instruments Q800 Dynamic Mechanical Analyzer in the DMA Multifrequency/Strain mode in tension using a deformation of 0.1% strain, a frequency of 1 Hz, a force track of 150%, and a preload force of 0.01 N. Each experiment was run from −50 to 100° C. using a heating rate of 2° C./min. DMA results are provided in FIG. 2. FIG. 2 demonstrates that the PETMP and d-limonene monomers reacted in the presence of UV light to form a thermoset network with a rubbery modulus of approximately 4.2 MPa.

2. A Series of High-Performance Sustainable Polymeric Materials Comprised of Limonene-Derived Poly(Thioether) Polymer Networks and Recycled Polystyrene Precipitated Phases.

In a second set of embodiments, the invention is a new materials engineering method for improving the material attributes of network polymers (including novel naturally-derived network rubbers) through nanocomposite polymer synthesis. By adding recycled polystyrene to the naturally-derived polymer networks in the invention, a number of material properties, including modulus, ultimate tensile strength, ultimate strain capacity and toughness are able to be tuned by varying PS additive composition. Furthermore, for certain composite formulations, the formation of precipitated PS nanodomains is shown to significantly improve toughness—more than one order of magnitude—in comparison with that of either virgin polystyrene (100% PS) or an unmodified limonene-derived rubber (0% PS). Improved toughness, as well as tunable moduli and other mechanical properties, serve as value-driving material properties that will broaden the overall application range of this new material system and increased value of recycled polymers may provide more economically viable recycling solutions that can help drive industrial adoption of sustainable practices. Additionally, the demonstration of high-integrity shape memory behavior across the glass transitions of both a limonene-derived polymer (rubber) (shape recovery near 0° C.) and polystyrene in a composite material (shape recovery near 95° C.) over the courses of 5-cycle free strain recovery experiments further exemplifies the potentially value-driving behavior of this unique recycled composite system.

Blended polymers containing recycled PS additives dispersed in D-limonene-co-polythiol network matrices were synthesized to create a series of polymer blends with greater toughness than either homopolymer exhibits individually. D-Limonene functions simultaneously as a solvent for dissolving polystyrene (PS) and as a monomer that undergoes UV-catalyzed thiol-ene polymerization reactions with polythiol co-monomers to produce polymeric products comprised of precipitated PS phases dispersed throughout elastomeric poly(thioether) networks. By varying PS additive composition, tailorability of microstructural morphology, modulus, toughness, tensile strength and strain capacity can be achieved which demonstrates a broad application range for the new material system of the invention. This marks the first instance in which the successful bulk synthesis and mechanical characterization of network polymers comprised solely of D-limonene and polythiol co-monomers are reported. The demonstrated synthetic utility of this naturally-derived polymer system as a new PS recycling strategy provides a unique materials-based avenue to achieving environmental sustainability, while combining non-renewable and renewable materials to produce blended networks that exhibit remarkable mechanical properties.

Figure 3:
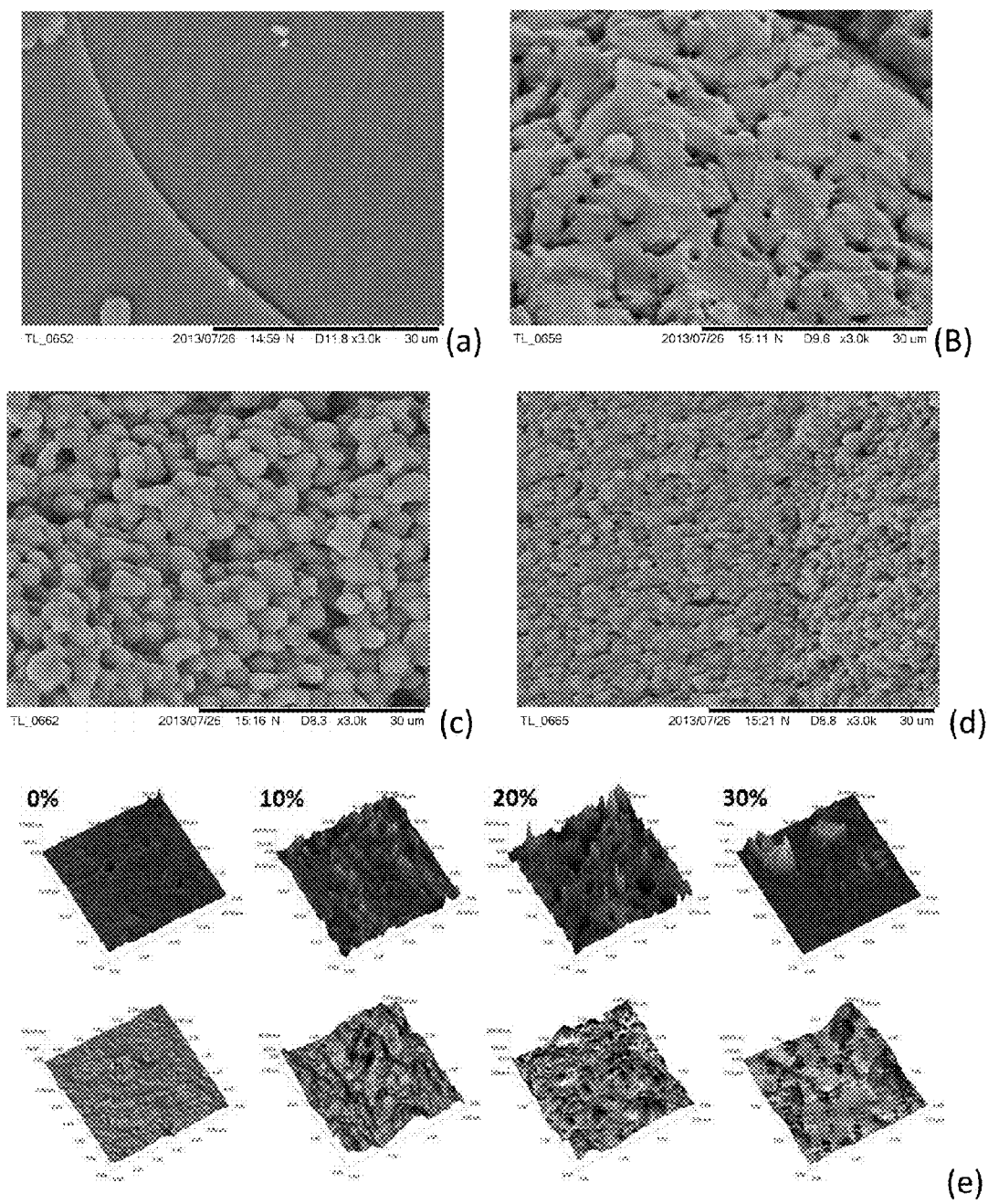
FIGS. 3 (*a*)-(*e*) are photographs of micro- or nanostructural imaging of polymers produced in embodiments of the invention showing the effects of increasing PS additive composition on microstructural morphology with (*a*)-(*d*) SEM images of samples containing 0, 10, 20, and 30% overall weight fraction PS were taken and are provided at 3000× magnification as well as (*e*) atomic force microscopy imaging results.

To understand the effects of increasing PS additive composition on microstructural morphology, SEM images of samples containing 0, 10, 20, and 30% overall weight fraction PS were taken and are provided at 3000× magnification in FIG. 3. For the SEM images in FIG. 3, the samples were prepared by immersion in liquid nitrogen, cold fracturing, attempted thermoplastic PS phase extraction using dichloromethane, sample drying, and gold sputtering prior to imaging. Consequently, the more lightly-colored phases in FIG. 3 correspond to poly(thioether) networks, and any cavities shown represent empty space that corresponds to extracted thermoplastic PS phases. In general, poly(thioether) network phases appear to decrease in average size with increasing PS composition, although the specific morphologies corresponding to the varying PS phases are notably different in nature. In FIG. 3(a), 0% PS shows only a single poly(thioether) phase, and in FIG. 3(b), 10% PS shows what appear to be ~3-5 μm sized cavities corresponding to PS phases that were dispersed throughout a network matrix similar to that shown in 3(a). In FIG. 3(c), 20% PS appears to have generated a bimodal microstructural morphology with spherical ~3 μm network phases and cavities that could correspond to PS microphases of similar size and geometry. In FIG. 3(d), the network obtained following extraction of the 30% PS composition appears to exhibit a bimodal microstructure with spherical network and PS phases that are sub-micron in size and of similar homogeneity and distribution to the 20% PS sample in 3(c). The interpretation of the SEM images is limited to a qualitative assessment to confirm that phase segregation had occurred uniformly throughout the matrix material, as quantitative interpretation is complicated by potential perturbations to the initial blended networks during the processing steps.

While SEM provides some insights into the microstructure of the bulk phase; direct evaluation of the surface morphology of the composite system was also performed. Given the importance of exposed-face character to mold release properties, bioactivity and tribological response, it is useful to assess the intrinsic phase behavior and topography at the surface. To provide such characterization, atomic force microscopy (AFM) of the composite systems at 0, 10, 20 and 30% PS weight fraction were obtained. Topographic maps of the micrographs of the assessed systems are provided at two separate scales, 20 μm×20 μm and 3 μm×3 μm and are provided in FIG. 3(e). The 3 μm×3 μm rendering also has phase contrast overlaid to elucidate phase boundaries, where present. While generally following the trends observed in SEM, the findings for this series can be summarized as follows: (1) 0% PS displayed a small amount of residual processing residues, exhibited exceptional flatness with shallow pitting (ca. 10 nm deep) and had no indication of intrinsic phase boundaries, (2) 10% PS displayed some PS sheeting at the microscale, similar to the gaps observed by SEM and possessed ca. 500 nm PS phase domains at smaller scale, (3) 20% PS displayed the largest microscale heterogeneity, exhibited the roughest surface morphology of the samples observed, had pitting and protrusions consistent with the scale of the features observed in the solvent etched PS SEM figures, and displayed microscale phase separation wherein the PS domain expressed smaller sub-domains on scales similar to that observed in the 10% PS system, and (4) the 30% PS sample presented an overall more homogeneous surface on the microscale with periodic large protrusions which appeared to be surface buckling; in the homogeneous regions, fully isolated PS nanodomains (<200 nm) saturated the landscape.

The SEM images in FIG. 3 show the remaining rubber (polymer) phases after solvent extraction of PS phases. These resulting polymers are by definition porous polymers with micro- or nanoporous morphologies. Consequently, the present invention also includes a process for preparing micro- or nanoporous polymeric substrates, and preparing such porous substrates through the processes described herein represent a route to recycling the recycled materials produced through the processes reported.

Figure 4:
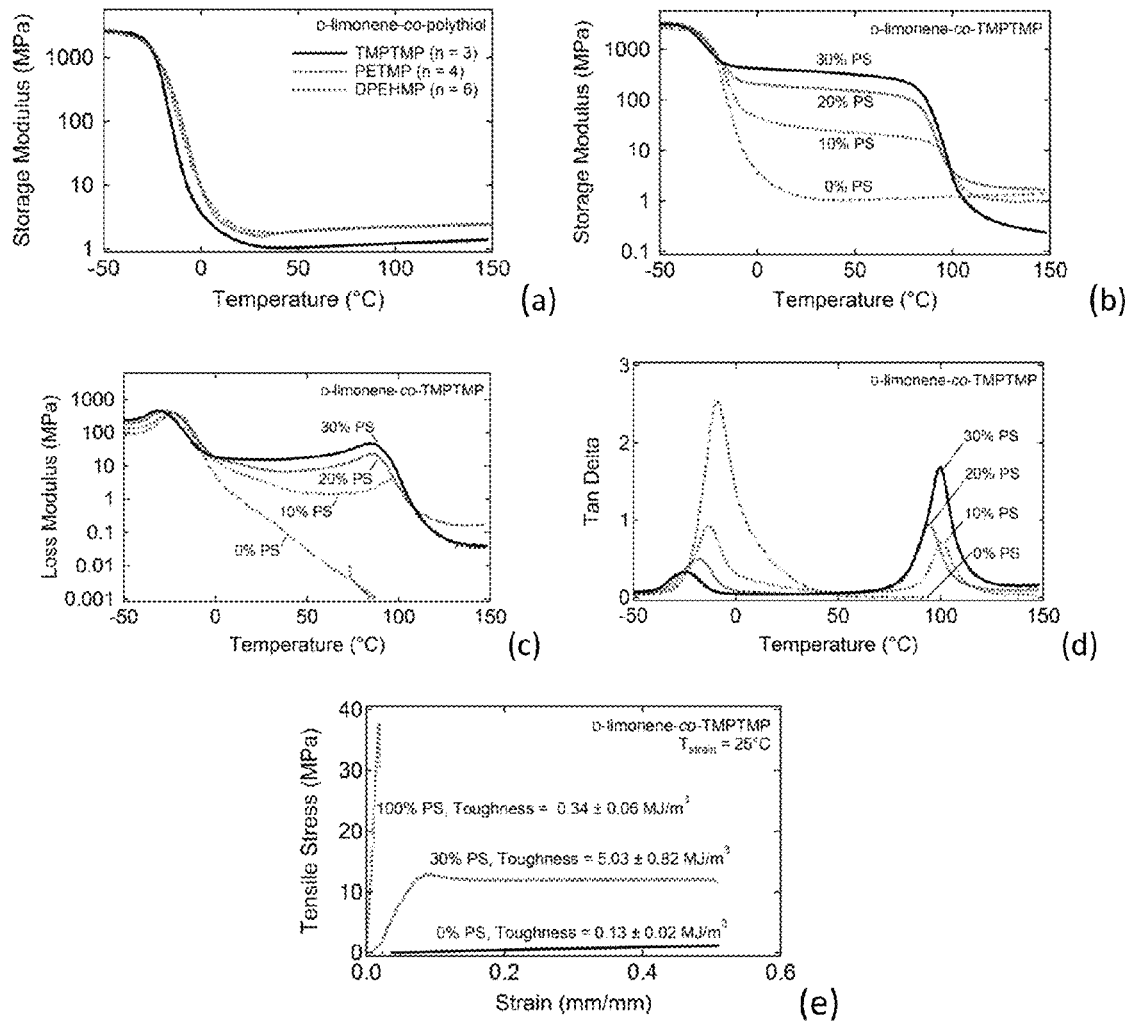
FIGS. 4 (*a*)-(*d*) are DMA results for limonene-co-TMPTMP samples containing either 0, 10, 20, and 30% overall weight fraction PS and (*e*) is tensile testing data for 0, 30, and 100% PS samples.

To determine the effects of increasing polystyrene composition on the thermomechanical behavior of the D-limonene-co-TMPTMP networks imaged in FIG. 3, dynamic mechanical analysis (DMA) experiments were run in tension on 0, 10, 20, and 30 wt % PS samples. FIG. 4(a) shows plots of storage modulus versus temperature for D-limonene-co-TMPTMP, -PETMP, and -DPEHMP networks. The increase in rubbery modulus from TMPTMP to PETMP-based networks as polythiol functionality increases from 3 to 4 is expected and indicates an increase in crosslink density with increased monomer functionality. The lack of an increase in rubbery modulus from PETMP to DPEHMP as functionality increases from 4 to 6 is most likely the result of poor monomer miscibility and high DPEHMP viscosity, which could prevent the reaction of functional groups and prevent network formation. FIGS. 4(b), 4(c) and 4(d) show DMA characterization data for D-limonene-co-TMPTMP networks containing varying PS additive compositions. Plots of (b) storage modulus, E', (c) loss modulus, E", and (d) tangent delta versus temperature for each PS composition are shown, and each PS-containing rubber whose DMA is shown in FIGS. 4 (b-d) exhibits a thermal transition below −10° C. that is consistent with the glass transition of the D-limonene-co-TMPTMP poly(thioether) network and also exhibits a thermal transition near 100° C. that is consistent with the glass transition of polystyrene. As polystyrene composition increases, the storage and loss modulus of each sample increase with a clear trend at temperatures between the glass transition of the rubber network and the glass transition of polystyrene. The toughening effect that arises from creating a material with combined glassy and rubbery phases is demonstrated in FIG. 4(e), which shows average strain-to-failure data for 0%, 30% and 100% PS D-limonene-co-TMPTMP samples at 25° C. While the 100% PS material exhibits brittle behavior at 25° C. and fails at 1.8% strain and the 0% PS material exhibits weak elastomeric failure and fails at a stress of 1.2 MPa, the 30% PS material exhibits a more ductile behavior and fails at 55% strain while also exhibiting a failure stress greater than 12 MPa. While the average toughness of the 100% PS sample at 25° C. was 0.34±0.06 MJ/m$^3$ and that of the 0% PS sample was 0.13±0.02 MJ/m$^3$, that of the 30% PS sample was 5.03±0.82 MJ/m$^3$. This increase in toughness at 25° C. of more than an order of magnitude in comparison with that of either homopolymer is promising, and a toughness of ~5 MJ/m$^3$, while lower than that of poly(acrylonitrile-co-butadiene-co-styrene) (ABS) and some other high-performance HIPS resins reported in the literature, actually exceeds reported toughness values for a number of HIPS materials. (B. Chen, J. R. G. Evans, *Journal of Polymer Science Part B: Polymer Physics* 2011, 49, 443).

The thermomechanical behavior as a function of PS fraction, taken in conjunction with the micro- and nano-domain features observed for the PS phase in this series by SEM and AFM, indicate that the observed toughening for the 30% PS material can be explained by the existence of a high number of nanodomains, which allow expression of a large surface to volume ratio for the PS fraction. Table 1 shows the effect of increasing PS composition on storage modulus E' and loss modulus, E" for PS-containing limonene-derived composites.

TABLE 1

| Wt % PS | Storage Modulus, E' (MPa), 250 C. | Loss Modulus, E" (MPa), 25° C. |
| --- | --- | --- |
| 0 | 1.1 | 0.3 |
| 10 | 27.8 | 3.4 |
| 20 | 173.4 | 7.9 |
| 30 | 370.8 | 15.5 |

Figure 5:
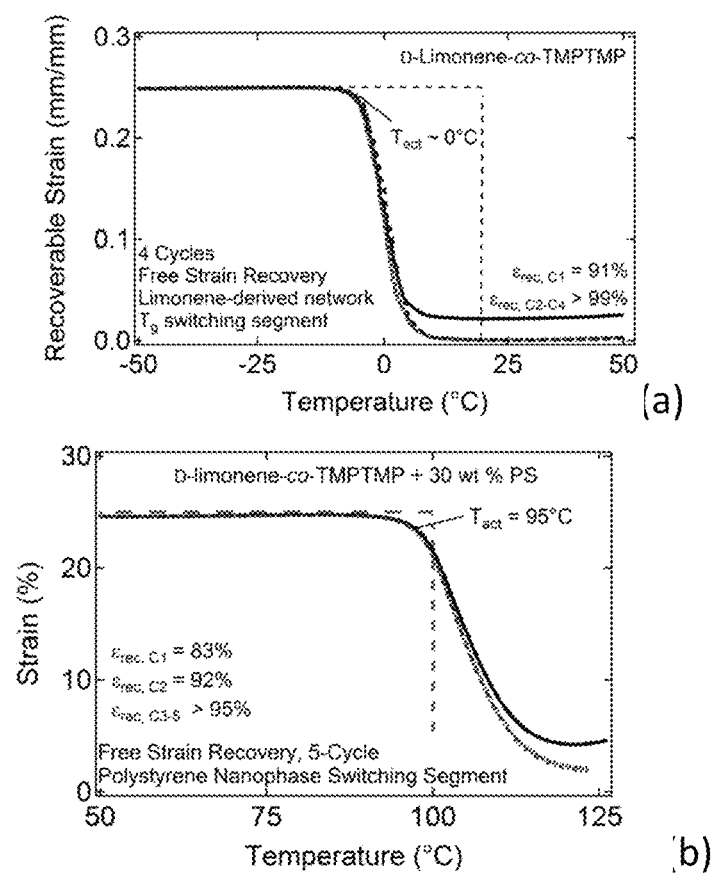
FIG. 5(*a*)-(*b*) are plots of strain versus temperature showing shape memory behavior across both thermal transitions in the 30% PS composite recycled material whose DMA results are shown in FIG. 4.

The tunable moduli in the materials in FIG. 4 indicate that these materials may have a commercial value that exceeds that of a traditional recycled material. An even greater increase in the commercial value of the recycled materials could occur if the materials are determined to have advanced material capabilities and marketed as such. The DMA results in FIG. 4 show that the PS-containing blends exhibit a drop in modulus across the $T_g$ of the poly(thioether) network and a drop in modulus that is associated with the glass transition of polystyrene, which is approximately 100° C. If a significant change in modulus (usually 2-3 orders of magnitude) occurs during a thermal transition, and if this change occurs over a fairly narrow temperature range, then such a thermal transition is often well-suited for shape memory behavior. As shown in FIG. 5(a), good cyclic shape memory behavior during free strain recovery was observed during constrained recovery at approximately 0° C. for a limonene-co-TMPTMP sample across the glass transition of the poly (thioether) network. Recoverable strains greater than 99% were observed after Cycle 1 for five-cycle free strain recovery characterization. As shown in FIG. 5(b), multi-cycle shape memory behavior was also observed at approximately 100° C. across the glass transition of the precipitated PS microphases for a 30% PS sample. Recoverable strains greater than 95% were observed after Cycle 2 for 25% prestrain. This demonstration of the shape memory effect the recycled materials opens the door to a number of investigative studies in this area, and shape memory will continue to be investigated in attempt to maximize commercial value.

In addition to containing a novel materials engineering method for recycling polymeric materials, this invention marks the first successful synthesis of a bulk curable network polymer comprised solely of limonene and a polythiol co-monomer by thiol-ene polymerization. Consequently, even without its polystyrene recycling aspect, the invention marks a breakthrough advancement in renewable polymer development. Because limonene-co-polythiol networks prepared from limonene and mercaptopropionate monomers contain internal ester linkages from the mercaptopropionate constituents, such network polymers are likely to be degradable in environmental or physiological environments. Materials produced by the "0%" PS compositions described herein thus may be suitable for a number of applications for which biodegradable polymers are desirable, including soft tissue engineering applications in which soft polymeric scaffolds are desirable.

Reinforcement and control of material properties of limonene-co-polythiol network rubbers was achieved using recycled polystyrene as shown in Table 1 and was also achieved using silica micro- and nanoparticle filler additives. Proof-of-concept of silica filler addition was achieved by addition of 10 wt % unmodified ~60 m particle size silica and ~10 wt % fumed ~0.2-0.3 μm particle size silica to limonene-co-TMPTMP polymers. The silica containing composite polymers exhibited elastomeric behavior and exhibited notable increases in mechanical integrity in comparison with unfilled analogs.

Example 2

Polymer Synthesis

Functional equivalents totaling 10 g of D-limonene (TCI America, >95%,) trimethylolpropane tris(3-mercaptopropionate), pentaerythritol tetrakis(3-mercaptopropionate) (Sigma Aldrich, >95%), and/or dipentaerythritol hexakis(3-mercaptopropionate) (Wako, >97%) were massed in glass vials, and 1 wt % 2,2'-dimethoxy-2-phenylacetophenone (DMPA) (Sigma Aldrich, >99%) photoinitiator was added. EPS powder, which was ground from EPS cups provided by Chick-fil-A, Inc. (CFA), was added to the monomer mixtures in varying quantities so as to formulate mixtures with polystyrene compositions of 0, 10, 20, and 30% overall weight fraction. The monomer and EPS mixtures were not miscible initially and were heated to 140° C. for 2 hours, after which the formation of homogeneous solutions occurred. The resulting solutions exhibited viscosity increases with increasing EPS composition. Neat films were cast by injecting the hot solutions inside glass molds preheated to 140° C. The injections were carried out inside a vacuum oven heated to 140° C. The hot glass molds were then immediately removed from the oven, placed in a UVP CL-1000L 365 nm UV Crosslinking Chamber, and exposed to 365 nm UV irradiation for 1 hour. Within 10-20 seconds of UV exposure, the clear homogeneous solutions inside the glass molds began to turn white, apparently undergoing polystyrene phase separation brought on by either poly (thioether) network formation, cooling temperatures, or both factors. The resulting films became completely white within 1-2 min. After 1 h, the cured films were post-cured at 130° C. at 1 torr for 24 hours. Without polystyrene, the poly (thioether) networks were amorphous, optically clear rubbers, and the addition of PS resulted in the formation of opaque materials.

Microstructural Imaging by Scanning Electron Microscopy:

SEM imaging was used to understand the effects of increasing PS composition on microstructural morphology. SEM samples were prepared by immersion of ~100 mg samples in liquid nitrogen for 30 s, cold fracturing by hand, attempted thermoplastic PS phase extraction by immersion of fractured ~50 mg samples in 100 mL dicholoromethane and light vortexing for 48 hr. using a LabConco RapidVap apparatus at vortex setting 15 and at ambient temperature and pressure, drying of DCM-swelled samples at 50° C. at 1 torr for 48 h, and gold sputtering with a Cressington 108 sputter coater, model 6002-8 (Ted Pella, Inc., Redding, Calif.) for 60 s at a height of 3 cm, prior to imaging. All samples were imaged on the fractured faces at 25, 500, and 3000× magnification using a Hitachi TM3000 Tabletop Microscope (Hitachi High Technologies America, Inc. Nanotechnology Systems Division, Dallas, Tex.), with a filament current set to 1750 mA. Software used to acquire the images was Bruker Quantax 70 Microanalysis Software package (Bruker Nano GmbH, Berlin, Germany).

Atomic Force Microscopy:

AFM micrographs of the system were taken with an Asylum 3D-SA atomic force microscope operated in tapping mode at 142 kHz, a nominal drive voltage of 500 mV. A silica nitride probe was used with k=40 N/m (Vista Probes) and a nominal tip diameter of 10-15 nm as reported by the manufacturer. Sample preparation included a fast rinse of the samples (0%, 10%, 20% and 30% PS) with a 25% by volume aqueous ethanol solution (<5 seconds) followed immediately by drying under a dry, filtered nitrogen gas flow for ca. 10 minutes and fixture to a glass slide.

Dynamic Mechanical Analysis:

DMA experiments were performed on triplicate samples using a TA Instruments Q800 Dynamic Mechanical Analyzer in the DMA Multifrequency/Strain mode in tension using a deformation of 0.1% strain, a frequency of 1 Hz, a force track of 150%, and a preload force of 0.01 N. Each experiment was run from −50 to 150° C. using a heating rate of 2° C./min on 4.0×25.0×0.75 mm rectangular samples, which were machined using a Gravograph LS100 40 W CO2 laser machining instrument.

Uniaxial Tensile Testing:

ASTM Type V dog bone samples were machined using a Gravograph LS100 40 W $CO_2$ laser machining device. All laser machined samples except for the rubbery 0% PS samples were sanded around the edges using 400, 800 grit sandpaper. Strain-to-failure experiments were conducted at 25° C. in a temperature chamber that utilizes forced convection heating on 0% and 30% samples synthesized in this study and on 100% PS samples (McMaster-Carr, $M_w$~350 kDa) on n≥5 specimens for each sample. The experiments were conducted using an Instron Model 5965 electromechanical, screw driven test frame equipped with a 500 N load cell and 1 kN high temperature pneumatic grips. An Instron Advanced Video Extensometer with a 60 mm field-of-view lens optically measured the deformation of the samples by tracking parallel lines applied at the ends of the gauge length. The samples were heated to 25° C. under zero load (unclamped bottom grip). The temperature was held for 10 min to allow for thermal equilibrium to be reached, after which the bottom grip was clamped, and then experiments were started thereafter using a deformation rate of 10 mm/min. Data were recorded using Instron Bluehill 3 software.

Shape Memory Characterization

To determine percent recoverable strain for select samples, shape memory characterization experiments were performed using a TA Instruments Q800 DMA on laser machined 25.0×4.0×0.4 mm rectangular specimens. In the DMA Strain Rate Mode in tension, rectangular specimens were heated to $T_g+25°$ C. (glass transitions, either for the poly(thioether) rubber networks or for polystyrene) were determined by the peak of the tangent deltas from the previous DMA results), allowed to equilibrate for 30 min, and then strained to deformations of 25%. The strained samples were then cooled to $T_g-50°$ C. and allowed to equilibrate for an additional 30 min. For free strain recovery experiments, which were used to measure the percent recoverable strains of the SMPs, the drive force was set to zero after equilibration at $T_g-50°$ C., the samples were re-heated to $T_g+50°$ C. at 2° C./min, and the free strain recovery experiments were repeated over four or five cycles. The amount of recoverable deformation was recorded using TA Instruments QSeries software and analysized using TA Instruments Universal Analysis software.

Silica Filled Composite Synthesis

Functional equivalents totaling 10 g of D-limonene (TCI America, >95%,) trimethylolpropane tris(3-mercaptopropionate), pentaerithritol tetrakis(3-mercaptopropionate) (Sigma Aldrich, >95%), and/or dipentaerithritol hexakis(3-mercaptopropionate) (Wako, >97%) were massed in glass vials, and 1 wt % 2,2'-dimethoxy-2-phenylacetophenone (DMPA) (Sigma Aldrich, >99%) photoinitiator was added. The mixtures were sonicated at 40° C. until the DMPA dissolved in the TMPTMP layer. Heating the immiscible mixtures to 100° C. for 3 min resulted in the formation of a homogeneous solution, which remained homogeneous after cooling to 25° C. The cooled solution was then added in 5 g quantities to FlackTek Max 15 polypropylene mixer cups. To one cup, untreated silica gel (Sigma Aldrich Corporation, ~63.0 m average particle size) was added, and to another cup, fumed silica (Sigma Aldrich Corporation, 0.2-0.3 m average particle size) was added. The mixtures were mixed at 1600 rpm for 30 s in a FlackTek DAC 150 FVZ-K Speedmixer, and the resulting monomer/silica mixes appeared to be well-mixed. The silica-containing mixtures were then transferred to glass molds separated by 1 mm-thick spacers, cured using 365 nm UV light for 45 min and post-cured at 120° C. for 24 h at 1 torr. The resulting reinforced thiol-ene composited exhibited significantly increased mechanical integrity in comparison with unfilled analogs.

3. Polymer Products

Figure 6:
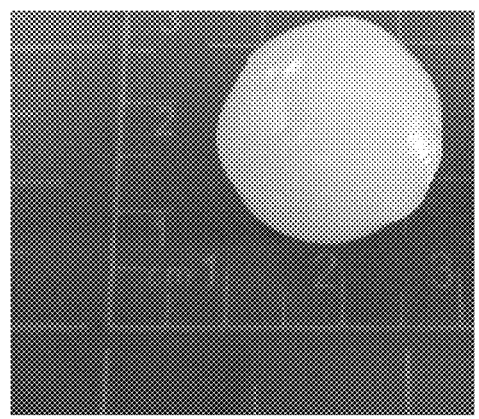
FIG. 6 is a photograph of a polymer putty product of an embodiment of the invention.

In a third set of embodiments, the invention constitutes processes for preparing products comprised of waste polymer and solvent/monomer components and products made by such processes. Such processes include molding of to-be-recycled polymer/monomer mixtures or solutions and curing of these mixtures or solutions while in molds to afford products with desired molded geometries. Another such process includes heating polymer/monomer mixtures to solution and subsequent cooling of these solutions before curing to afford thermally stable, homogeneously mixed A+B type resins such as that pictured in FIG. 6 that can be packaged and cured when desired at future times, whether at 25° C. or after re-heating to solution. In a third such process, direct ink write 3D printing of uncured resins such as that pictured in FIG. 6 is achieved utilizing the precipitated PS phases as filler particulates to afford rheological behavior characteristic of that of 3D printable inks (i.e., an observed yield stress above which flow occurs and below which flow does not occur so that geometries can be maintained upon printing of resins from a nozzle under pressurized conditions). The addition of silica filler as described in above also had a similar effect on uncured limonene/polythiol mixture rheology, and silica filler addition represents an alternative route to preparing a 3D printable resin. In a fourth such process, after the synthesis of composites comprised of precipitated thermoplastic nano- or microdomains, porous network polymeric substrates are fabricated by extraction of thermoplastic phases using appropriate solvents or using other heterophase removal techniques. Unique porous morphologies may be achievable using the technique, and the SEM images of the nano- or microporous network polymers in FIG. 3, which were obtained by subjecting neat composite polymer specimens to PS extraction in toluene, demonstrate proof-of-concept for this process of preparing nano- or microporous substrates.

Recovery or reclamation of polystyrene as described in the first embodiment (1. Waste Polymer Recovery Process) is achieved by addition of polythiol co-monomer and photoinitiator and subsequent heating to 140° C., which results in a homogeneous dissolution of all species. Pouring this hot solution into a pre-heated mold and subsequent UV irradiation causes the formation of an elastomeric poly(thioether) network, after which phase separation of polystyrene proceeds, producing dispersed polystyrene microphases and/or nanophases throughout the network. The insoluble mix before heating and the homogenous dissolved mix in after heating as described above are suitable as products for sale to those who wish to carry out the subsequent reactions for molded products. The mixture of the second vial, produced when the contents of the first vial is heated to 100-140 C will, when cooled, form a solid mass described herein as "putty". A photograph of such as putty is shown in FIG. 6.

Example 3

Molded Prototype Cell Phone Case Prototype Fabrication

Structures and articles of manufacture were also demonstrated by the construction of an iPhone 4™ protective case prototype molded from the dissolved product described above is also aspects of the present invention. The homogenous mixture described above consisting of D-limonene-co-TMPTMP with 30% PS was molded with UV cure (365 nm) for one hour at 25° C. This prototype case demonstrates the ease with which the material of the invention may be processed into useful products for potential industrial application.

A positive mold with geometric dimensions approximately representative of those of a protective case made to fit an Apple iPhone 4™ cellular device was designed using SolidWorks software. Using a Stratasys Fortus 360 mc 3D printer, positive molds were printed using the Stratasys base-soluble resin. Each printed positive molds was then placed in pre-assembled 2"×6"×4" acrylic molds and attached to the bottom of the mold using super glue. Pre-mixed silicone Sylgard 184™ base and curing agent were then poured over the printed molds and evacuated at 1 torr at 25° C. for 5 min, after which a smooth surface layer was observed. The silicone mold was then cured at 50 C for 4 h. The printed resin was dissolved out of the silicone mold by etching in 0.1 N NaOH solution using the Stratasys base bath for 72 h. The resulting silicone mold contained a negative image of an Apple iPhone 4™ case. This silicone mold and 50 g of functional equivalents of limonene and TMPTMP with 30 wt % PS additive were pre-heated to 140° C. for 2 h. The dissolved PS solution was then poured in the oven into the silicone mold. The molded solution was then moved into a UVP CL-1000L 365 nm UV crosslinking chamber, exposed to UV irradiation for 1 h, and post-cured at 130° C. at 1 torr for 24 hours.

The mixture changes in optical behavior from transparency to opacity as the PS content heterophase increases in the D-limonene-co-polythiol networks. D-limonene-co-TMPTMP films containing 0% and 30% PS additives go from nearly transparent to opaque.

Processable Putty Preparation:

Functional equivalents totaling 10 g of D-limonene (TCI America, >95%,) trimethylolpropane tris(3-mercaptopropionate), pentaerithritol tetrakis(3-mercaptopropionate) (Sigma Aldrich, >95%), and/or dipentaerithritol hexakis(3-mercaptopropionate) (Wako, >97%) were massed in glass vials, and 1 wt % 2,2'-dimethoxy-2-phenylacetophenone (DMPA) (Sigma Aldrich, >99%) photoinitiator was added. EPS powder, which was ground from EPS cups provided by Chick-fil-A, Inc. (CFA), was added to the monomer mixtures in varying quantities so as to formulate mixtures with polystyrene compositions of 0, 10, 20, and 30% overall weight fraction. The monomer and EPS mixtures were not miscible initially and were heated to 140° C. for 2 hours, after which the formation of homogeneous solutions occurred. The homogeneous mixtures were then cooled to 25° C. and subsequently exhibited transitions from transparency to opacity. The opaque, uncured products were soft, putty-like resins that could be molded into desired geometries and subsequently cured either at 25° C. or by re-heating to elevated temperatures in the range of 140 to 180° C. to re-afford homogeneous solutions, which could then be molded into desired geometries and UV cured. The "putty" like product claimed herein is a metastable all-in-one A+B resin that could be packaged as such and sold as a commercial product fur subsequent curing at a later, desired time.

Processable Putty as a 3D Printable Ink:

The processable putty shown in FIG. 6 was molded from an undefined geometric state into a spherical geometric state using applied shear stress/pressure at 25° C. When shear stress/pressure was applied, the putty resin began to flow. Upon removal of the applied shear stress/pressure, the putty resin ceased flowing and maintained the geometry into which it was processed. In this experimental example, the polystyrene precipitated phases act as fillers that stabilize resin mixtures and afford a rheological profile that includes a yield stress, above which flow occurs and below which processed geometry is maintained. Such rheological behavior is consistent with that of a 3D printable or otherwise moldable resin, and upon printing a putting resin such as that in FIG. 6, the resin could be cured using UV light to fix printed geometries. The third embodiment of the invention thus includes a 3D printable in or otherwise processable resin produced by the processes described in Embodiments 1 and 2.

Silica Reinforcement as a Route to 3D Printable Rheology:

Approximately 1 g of each of the silica-containing monomer mixtures prepared as described in [0056] were removed from the FlackTek Max 15 cups after mixing using a spatula and were transferred to 3 mL polypropylene syringes fitted with 18 gauge needles. Both the unmodified and fumed 10% silica-containing samples flowed from the needle tips and maintained their extruded geometries as observable by unmagnified inspection. Increasing the fumed silica composition to 15% resulted in more difficult needle extrusion but better fixity of extruded filament geometry. These silica-containing inks were then UV cured at 365 nm for 2 h and post-cured at 120° C. for 24 h. When some loss of printed geometry was observed after post-curing, DMPA photoinitiator composition was increased to 5 wt % for the 15 wt % fumed silica sample, and the above process was repeated, after which the syringe-printed geometries were fixed and maintained.

Porous Substrate Preparation:

The SEM images in FIG. 3 show the remaining rubber phases after solvent extraction of PS phases. These resulting polymers are by definition porous polymers with micro- or nanoporous morphologies. Consequently, the present invention also includes a process for preparing micro- or nanoporous polymeric substrates, and preparing such porous substrates through the processes described herein represent a route to recycling the recycled materials produced through the processes reported.

In the foregoing specification, the invention has been described with reference to specific embodiments. It will, however, be evident that various modifications and changes can be made within the spirit and scope of the invention. The scope of the invention is not intended to be limited to the particular forms disclosed and the invention covers all modifications, equivalents, and alternatives falling within the spirit and scope of the invention as defined by the claims. The specification is, accordingly, to be regarded in an illustrative rather than a restrictive sense. Therefore, the scope of the invention should be limited only by the claims.

The invention claimed is:

1. A network crosslinked poly(thioether) rubber composition wherein the rubber is a crosslinked poly(thioether) consisting of a terpene and a polythiol comprising at least three thiol groups.

2. The composition of claim 1, wherein the terpene is selected from the group consisting of D-limonene, L-limonene, or mixtures thereof.

3. The composition of claim 1, wherein the polythiol is selected from the group consisting of trimethylolpropane tris(3-mercaptopropionate), pentaerythritol tetrakis(3-mercaptopropionate), and dipentaerythritol hexakis(3-mercaptopropionate).

4. The composition of claim 1, further comprising a thermoplastic filler selected from the group consisting of polystyrene, polyvinyl chloride, polyethylene-terephthalate, poly(methyl methacrylate), poly(bisphenol A carbonate), poly(acrylonitrile-co-butadiene-co-styrene), poly(lactic acid), thermoplastic polyurethane and combinations thereof.

5. The composition of claim 4, wherein the thermoplastic filler is polystyrene.

6. The composition of claim 5, wherein the composition has an overall weight fraction of polystyrene of 10, 20, or 30%.

7. The composition of claim 1, wherein the composition further comprises one or more of a thermoplastic polymer.

8. The composition of claim 1, further comprising one or more ceramic fillers.

9. The composition of claim 8, wherein the ceramic filler is silica.

10. A method of making the network crosslinked poly(thioether) rubber composition of claim 1 comprising the step of:
reacting a mixture comprising a terpene and a polythiol, wherein the polythiol comprises at least three thiol groups; and
wherein the terpene functions as a solvent.

11. The method of claim 10, wherein the mixture further comprises a free radical initiator.

12. The method of claim 11, wherein the free radical initiator is a photoinitiator.

13. The method of claim 12, wherein the photoinitiator is 2,2-dimethoxy-2-phenylacetophenone.

14. The method of claim 12, further comprising a step of curing the mixture by exposure to ultraviolet radiation.

15. The method of claim 11, further comprising a step of curing the mixture by heating the mixture.

16. The method of claim 15, wherein the mixture is heated to 100-180° C.

17. The method of claim 10, wherein the mixture further comprises a thermoplastic filler selected from the group consisting of polystyrene, polyvinyl chloride, polyethyleneterephthalate, poly(methyl methacrylate), poly(bisphenol A carbonate), poly(acrylonitrile-co-butadiene-co-styrene), poly(lactic acid), thermoplastic polyurethane and combinations thereof.

18. The method of claim 17, wherein the thermoplastic filler is polystyrene.

19. The method of claim 18, wherein the mixture further comprises a free radical initiator.

20. The method of claim 19, wherein the free radical initiator is a photoinitiator.

21. The method of claim 20, further comprising a step of curing the mixture by exposure to ultraviolet radiation.

22. The method of claim 19, further comprising a step of curing the mixture by heating the mixture.

23. The method of claim 22, wherein the mixture is heated to 100-180° C.

24. The method of claim 10, wherein the mixture further comprises one or more ceramic fillers.

25. The method of claim 24, wherein the ceramic filler is silica.

26. The method of claim 25, wherein the mixture further comprises a free radical initiator.

27. The method of claim 26, wherein the free radical initiator is a photoinitiator.

28. The method of claim 27, further comprising a step of curing the mixture by exposure to ultraviolet radiation.

29. The method of claim 26, further comprising a step of curing the mixture by heating the mixture.

30. The method of claim 29, wherein the mixture is heated to 100-180° C.

31. The method of claim 12, further comprising a step of heating the mixture above 100° C. and a subsequent step of cooling the mixture.

32. The method of claim 31, further comprising a curing the mixture by exposure to ultraviolet radiation.

33. The method of claim 31, further comprising a curing the mixture by heating the mixture.

34. The method of claim 33, wherein the mixture is heated to 100-180° C.

35. The method of claim 10, wherein the terpene is selected from the group consisting of D-limonene, L-limonene, or mixtures thereof.

36. The method of claim 10, wherein the polythiol is selected from the group consisting of trimethylolpropane tris(3-mercaptopropionate), pentaerythritol tetrakis(3-mercaptopropionate), and dipentaerythritol hexakis(3-mercaptopropionate).

37. The polymer composition of claim 7, wherein the one or more thermoplastic polymers are microscale or nanoscale precipitate phases.

38. The polymer composition of claim 5, wherein the polystyrene is an expanded polystyrene (EPS).

* * * * *